United States Patent [19]
Smales

[11] 3,809,200
[45] May 7, 1974

[54] CLUTCH DISC WITH REMOVABLE FRICTION PADS

[75] Inventor: Herbert Smales, Morley, England

[73] Assignee: BBA Group Limited, Cleckheaton, Yorkshire, England

[22] Filed: June 19, 1972

[21] Appl. No.: 264,330

[30] Foreign Application Priority Data
June 22, 1971  Great Britain .................. 29189/71

[52] U.S. Cl. .............................................. 192/107 C
[51] Int. Cl. ............................................. F16d 13/64
[58] Field of Search ........................... 192/107 C, 52

[56] References Cited
UNITED STATES PATENTS

| | | | |
|---|---|---|---|
| 2,986,252 | 5/1961 | Bois | 192/107 C |
| 3,696,902 | 10/1972 | Dantele | 192/107 C |
| 2,103,433 | 12/1937 | Newton | 192/107 C |
| 2,888,122 | 5/1959 | Garmager | 192/107 C |
| 3,526,307 | 9/1970 | Falzone | 192/107 C |

*Primary Examiner*—Benjamin W. Wyche
*Attorney, Agent, or Firm*—Stevens, Davis, Miller & Mosher

[57] ABSTRACT

A clutch plate assembly having a center boss part and pad elements removably mounted on the periphery of the center boss part and extending outwardly therefrom. Each pad element includes a backing plate and a pad of friction material firmly secured thereto. The pad elements are mounted in pairs which are peripherally spaced around the center boss part, the pad elements in each pair being mounted with their backing plates axially opposed in back-to-back relationship and each backing plate being capable of flexing axially relative to the center boss part and the backing plate which opposes it. A cushioning surface, preferably in the form of a spring plate, is interposed between each pair of opposed backing plates to provide a cushioning effect for at least one of the pad elements of a pair when the backing plates are flexed axially towards each other. Also, a restraining element preferably constituted by one or more pins is provided for restraining flexure of the backing plates of each pair axially away from each other beyond a predetermined spacing.

8 Claims, 10 Drawing Figures

FIG.10.

CLUTCH DISC WITH REMOVABLE FRICTION PADS

This invention relates to friction clutch devices and is primarily directed to a clutch plate assembly of the type which carries pads of friction material on each side of the clutch plate. Such type clutch plate assemblies are well known in the art and are generally for use in a friction clutch device in which the pads of friction material are intended, during engagement or take-up of the clutch device for power transmission, to contact opposed pressure and flywheel plates located on opposite sides of the clutch plate assembly. The present invention is particularly concerned with the means by which the pads of friction material are carried in the clutch plate assembly.

According to the present invention there is provided a clutch plate assembly comprising a center boss part and pad elements removably mounted on the periphery of the center boss part and extending outwardly therefrom, each said pad element comprising a backing plate and a pad of friction material firmly secured thereto; said pad elements being mounted in pairs which pairs are peripherally spaced around the center boss part, the pad elements in each pair being mounted with their backing plates axially opposed in back-to-back relationship and each backing plate being capable of flexing axially relative to the center boss part and to the backing plate which opposes it; wherein cushioning means is interposed between each pair of opposed backing plates which means provides a cushioning effect for at least one of the pad elements of a pair when the backing plates of said elements are flexed axially towards each other, and wherein means is provided for restraining flexure of the backing plates of each pair axially away from each other beyond a predetermined spacing.

Preferably the cushioning means comprises spring plate means located between the opposed backing plates and appropriately formed, conveniently by crimping, to provide an axial spring effect on one or both of the opposed pad elements between which it is interposed. Independent spring plate means may be provided for each pair of pad elements or, alternatively, common spring plate means can be provided for all the pairs of pad elements. By providing independent spring plate means the weight of the clutch plate assembly may be maintained at a minimum (which is desirable to reduce the inertia of the assembly in use) and preferably the independent spring plate means is substantially co-extensive with the pair of pad elements between which it is interposed. The latter arrangement can, advantageously, be used to provide a construction of a clutch plate assembly having a large degree of openness between the peripherally adjacent pairs of pad elements which openness is often desirable for achieving efficient airflow over the pressure and flywheel plates which are intended to engage with the clutch plate assembly in use. Common spring plate means may be provided for all the pairs of pad elements in the form of a generally annular plate extending around the periphery of the center boss part and between the opposed backing plates of each pair of pad elements. The generally annular plate is appropriately formed as, for example, by slotting and crimping between each pair of pad elements to provide the desired axial spring effect.

The spring plate means is preferably assembled in the clutch plate assembly so that it is readily removable for replacement or servicing purposes and may be mounted on the center boss part or carried by the backing plates of the pairs of pad elements between which it is interposed. The spring plate means may conveniently be mounted on the center boss part and secured by rivets, bolts, spot welds or screws. (These latter means of securing may additionally be used to secure the backing plates to the center boss part and it is then a simple matter to replace or service the pad elements and/or the spring plate means by removing the securing rivets, bolts, spot welds or screws and re-securing new or serviced components to the center boss part as necessary). If the spring plate means is carried by the backing plates of the pad elements this is conveniently achieved by mounting the spring plate means on one or more removable locating pins which extend between the opposed backing plates of the pairs of pad elements. In this latter type of arrangement it is preferred that each pair of pad elements has a discrete spring plate means which is independent of the other pairs (rather than the aforementioned generally annular plate arrangement) since this facilitates removal and replacement of a spring plate means for a given pair of pad elements without disrupting the cushioning provided by spring plate means of the other pairs of pad elements.

The backing plates of each pair of pad elements are restrained from flexure axially away from each other beyond a predetermined spacing to alleviate the possibility of them being over strained as a result of the axial drag which is imparted to the pad elements from the flywheel and pressure plates during disengagement of a clutch assembly which incorporates the clutch plate assembly. The means for restraining such flexure may be provided, at least in part, by the mounting of the backing plates on the center boss part and the rigidity of the material of the backing plates in its regions adjacent to such mountings. Preferably however, the backing plates of each pair of pad elements are at least partly restrained from flexure axially away from each other beyond a predetermined spacing by one or more restraining pins which extend between the opposed backing plates. Conveniently, in the construction in which the spring plate means is carried by the backing plates, the restraining pins and aforementioned locating pins are provided by the same pins.

Preferably the opposed backing plates of the pairs of pad elements are maintained in engagement with the interposed cushioning means and if required the means for restraining flexure of the backing plates of the pairs axially away from each other beyond a predetermined spacing retain the opposed backing plates to pre-load the interposed cushioning means.

In constructions in which the spring plate means is mounted on the center boss part an axially extending projection may be provided on each backing plate which projection slidably extends into a complementary aperture in the spring plate means. Preferably such projection of each backing plate extends through its respective complementary aperture in the spring plate means and into a further preferably complementary aperture in the backing plate of the pad element which is in back-to-back relationship therewith. By such an arrangement shear forces developed between the pad element and the pressure plate means are taken in part by the engagement of the projection with the complementary aperture in the spring plate means and consequently the pad element is restrained from displacement over the spring plate means in tangential and radial directions relative to the axis of rotation of the clutch plate assembly. It will be apparent that in the preferred arrangement in which the projection of each backing plate extends through a complementary aperture in the spring plate means and into a further aperture in the backing plate of the pad element in back-to-back relationship therewith, the radial and tangential sheer forces developed between each pad element and the spring plate means may be taken, in the major part, on the two projections which communicate through the apertures in the spring plate means between the respective backing plates of both pad elements. An advantage of such interengagement between the opposed pad elements is that the clutch plate assembly can be manufactured with a high burst strength. In a conventional clutch plate assembly in which an annular band of friction material is bonded or riveted to the clutch plate, failure due to bursting occurs when the centripetal forces developed within the rotating clutch plate assembly overcome the mechanical strength of the friction material. However we have found that in the aforementioned arrangement of clutch plate assembly bursting occurs when the engaging projections and the mountings of the pad elements fail under the action of the centripetal stresses and this normally occurs at much higher revolutions per minute than would be the case with a conventional clutch plate assembly to which an annular band of friction material is attached.

If desired an additional cushioning effect may be provided on the clutch plate assembly by attaching the friction material to the convex face of a flexible and dish-shaped backing plate. Thus, on engagement of the clutch, the backing plates would become flattened as the pad elements of each pair are urged axially towards each other and thereby provide a cushioning effect. If the friction material is bonded to a dish-shaped backing plate it may be necessary for the material to be provided with slots in its exposed face in order to prevent cracking under flexure.

Usually the clutch plate assembly will have at least three pairs of pad elements positioned in a symmetrically spaced array around the axis of the clutch plate assembly. Preferably all of the pad elements and, in the case of independent cushioning means for each pair of pad elements, all of the spring plate means are respectively of a similar basic construction to facilitate standardization of the components for replacement and manufacturing purposes. However in order to equalize the wear rate differential, different areas and thicknesses of friction material may be required on the pressure plate and flywheel sides of the clutch plate assembly.

Each pad of friction material will usually be firmly secured to its respective backing plate by bonding techniques although alternative or additional means of securing, such as riveting or spigoting may be used. The pad elements as used in the present invention may be of differing thicknesses in order to balance the thermal properties on each side of the clutch plate. Furthermore, the pads may be provided with a radially extending slot down the center of the pad in order to allow them to flex and thereby resist thermal cracking under the action of the heat developed during the engagement of the clutch assembly. These slots also tend to scavenge or wipe the pressure and flywheel plates, thereby collecting any particles of friction material which have been rubbed off the faces of the pads.

Further according to the present invention there is provided a friction clutch device which incorporates a clutch plate assembly constructed in accordance with the invention, the clutch plate assembly being mounted for axial rotation and being located axially between a pair of transmission plates (generally a flywheel plate and a pressure plate) with which the pads of friction material on opposite sides of the clutch plate are intended to frictionally engage during take-up or engagement of the clutch device.

Embodiments of the present invention will now be described by way of example only, with reference to the accompanying illustrative drawings in which:

FIG. 10 is an exploded perspective view of a modified construction for the pair of pad elements and interposed spring plate means which construction is suitable for use in the clutch plate assembly of FIG. 7.

Where possible throughout the following description the same parts or members in each of the Figures have been accorded the same references.

Figure 1:
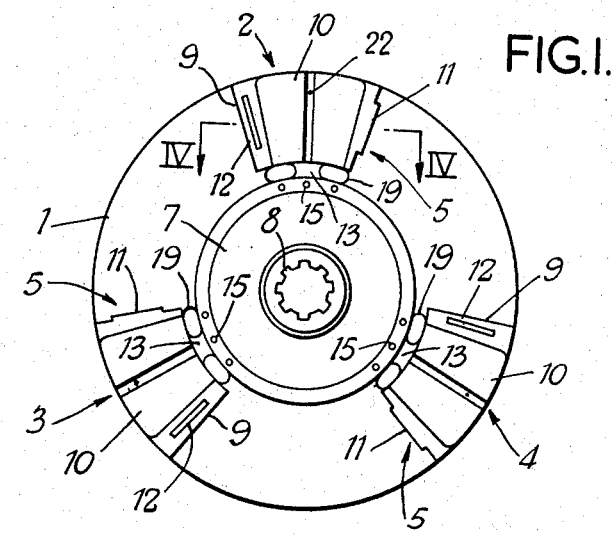
FIG. 1 shows one side of a clutch plate assembly in accordance with the invention in which a spring plate carries three pairs of pad elements.
Figure 2:
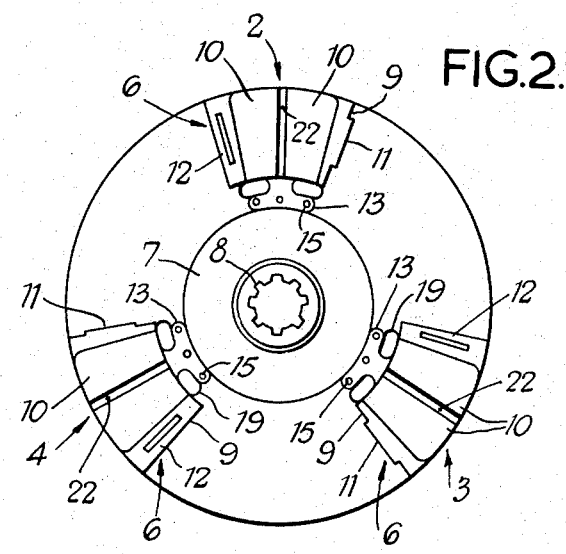
FIG. 2 shows the opposite side of the clutch plate assembly shown in FIG. 1.
Figure 3:
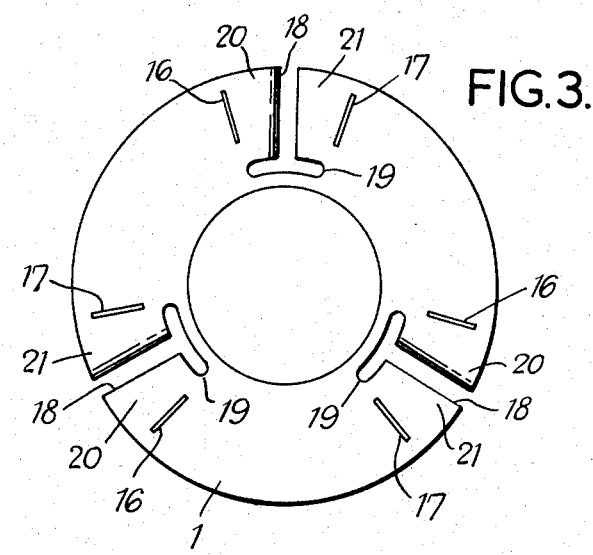
FIG. 3 illustrates the spring plate of the assembly shown in FIG. 1 prior to the pad elements being mounted on it.
Figure 5:
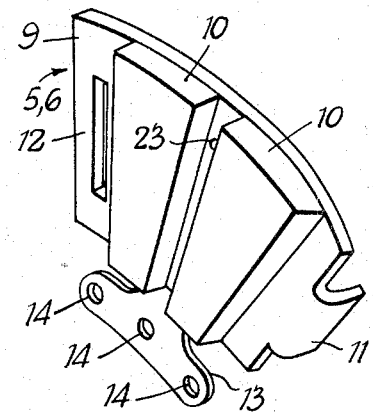
FIG. 5 is a perspective view of a pad element which is incorporated in the clutch plate assembly of FIG. 1.

The clutch plate assembly illustrated in FIGS. 1 and 2 comprises an annular spring plate 1 which carries three pairs (shown generally at 2, 3 and 4) of similar pad elements one of which is shown in FIG. 5. The three pairs of pad elements are circumferentially spaced around the intended axis of rotation of the clutch plate assembly and the pad elements in each pair are located in back-to-back relationship on opposite sides of the spring plate 1. For convenience of description the pad elements of each pair on one side of the spring plate 1 are indicated at 5 and the pad elements of each pair on the opposite side of the spring plate 1 are indicated at 6.

The annular spring plate 1 is riveted to a peripheral annular flange of a center boss part 7 by which the clutch plate assembly is intended to be mounted in a friction clutch device in known manner. The center boss part 7 is splined at 8 to receive a complementary splined shaft (not shown) of the friction clutch device about the axis of which shaft the clutch plate assembly is intended to rotate.

Each of the pad elements 5 and 6 comprises a backing plate 9 which has bonded thereto two pads of friction material 10. The backing plate 9 has an axial extending projection in the form of a tongue 11 and an elongated aperture 12 which is complementary to the tongue 11. In addition, the backing plate 9 has an extension portion 13 with an array of holes 14 through which the pad element is riveted at 15 onto the spring plate 1. Conveniently the rivets 15 are the same as those used to secure the boss portion 7 to the annular clutch plate 1.

The spring plate 1 is provided with three pairs of radially extending apertures 16, 17 which are circumferentially disposed in a similar array to the three pairs of pad elements 2 to 4. The apertures 16 and 17 in each pair are in alignment (as viewed axially of the spring plate) with the respective tongues 11 and apertures 12 of the pair of pad elements respectively associated therewith. With the pad elements 5 and 6 riveted at 15 to the clutch plate 1, the tongue 11 of each pad element 5 extends through the complementary aperture 17 in the spring plate 1 and into the complementary aperture 12 of the backing plate 9 for the pad element 6 which is in back-to-back relationship therewith. Similarly the tongue 11 of each pad element 6 extends through the compementary aperture 16 in the spring plate 1 and into the complementary aperture 12 in the backing plate 9 of the pad element 5 which is in back-to-back relationship therewith.

By having the tongue 11 of each of the backing plates in each pair of pad elements passing through a complementary aperture in the spring plate 1 to engage with a complementary aperture in the backing plate of the pad element of the pair which is on the opposite side of the spring plate, the shear forces which are developed between the pad elements and spring plate (when a friction clutch device incorporating the clutch plate assembly is engaged) and which would tend to displace the pad elements tangentially relative to the axis of rotation of the spring plate are taken, in part, on the tongues 11.

Figure 4:
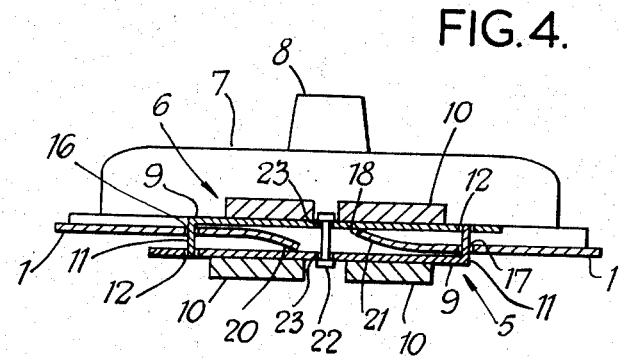
FIG. 4 illustrates a part section of the clutch plate assembly taken on the line IV — IV of FIG. 1 and shows cushioning of the pad elements by single crimping of the spring plate.

The spring plate 1 has three radially extending slots 18 which are circumferentially spaced to be respectively located between each pair of apertures 16 and 17. Each of the slots 18 opens at the outer circumferential edge of the annular spring plate 1 and extends radially inwardly to a position adjacent to the inner circumferential edge where it widens in a circumferential sense as at 19 to be of substantially "T" shape. It will be apparent that each slot 18 underlies the pair of pad elements 5 and 6 respectively associated with its adjacent apertures 16 and 17 and the portions of the spring plate adjacent to the slot 18 are deformed from the radial plane of the clutch spring by crimping in opposite axial directions as shown at 20 and 21 (see FIG. 4) to provide "single crimping". These deformed portions 20 and 21 normally maintain the backing plates of each pair of pad elements out of face-to-face contact with the spring plate 1.

The spring plate 1 will generally be made from a thin sheet of metal and the portions 20 and 21 have a degree of flexibility in the axial sense of the clutch plate assembly. Consequently when the pads 10 engage a pair of opposite transmission plates of a clutch device in which the clutch plate assembly is incorporated and the clutch is taken up, the pad elements 5 and 6 of each pair will be displaced axially towards each other and into substantially face-to-face contact with the spring plate 1 as the deformed portions 20 and 21 are straightened into the plane of the spring plate 1. The resilient mounting of the pad elements 5 and 6 in this way provides cushioning for the pads 10 during take-up of the clutch.

Since the extension portion 13 of each backing plate 9 is rigidly secured by the rivets 15 to the spring plate 1 and to the center boss portion 7, each extension portion 13 between the rivets 15 and pad 10 has to exhibit a slight degree of flexibility in an axial sense while ensuring that the tongues 11 maintain engagement at least with the apertures 16 and 17 with which they respectively co-operate (and preferably also with the apertures 12 with which they respectively co-operate). As will be appreciated, during flexing of the extension portion 13 on engagement and dis-engagement of the clutch device, the tongues 11 must have sufficient clearance to slide axially through the apertures 12 and 16 or 17 with which they respectively co-operate.

The extension portion 13 may, together with its mounting on the center boss part 7, provide sufficient rigidity to restrain the opposed pad elements 5 and 6 of each pair from flexure axially away from each other beyond a predetermined spacing. However, it is preferred that a restraining or anti-drag pin in the form of a rivet 22 is provided between each pair of opposed backing plates 9. Each rivet 22 extends through an aperture 23 located in each backing plate 9 of an opposed pair between the two friction pads 10 on each backing plate, is located within the slot 18 between that pair of backing plates and prevents flexure of the two opposed backing plates axially away from each other beyond a predetermined spacing. Although the rivets 22 will serve to retain the tongues 11 in engagement with the respective apertures 16 and 17 in the spring plate 1 and with the respective aperture 12 in the opposed backing plate 9, the prime purpose of the rivets is to alleviate the possibility of the backing plates in each opposed pair from being overstrained during their flexure axially away from each other as a result of the axially directed drag forces which are imparted to the pad elements by movement of the transmission plates of a clutch device during disengagement of the clutch.

Figure 6:
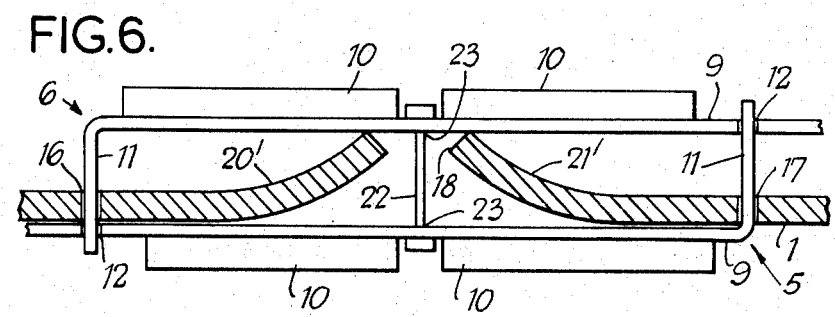
FIG. 6 illustrates a part section of part of a modified clutch plate assembly (in similar section to that in FIG. 4) in which one of the back-to-back pair of pad elements shown is cushioned by "double crimping" of the spring plate.

In the modification shown in FIG. 6 the portions of the spring plate 1 adjacent to each of the slots 18 are deformed from the radial plane of the clutch plate by crimping in the same axial directions as shown at 20' and 21' to provide double crimping. The deformed portions 20' and 21' normally maintain the backing plate 9 of the upper pad element 6 (as shown in the drawing) out of face-to-face contact with the spring plate 1. Consequently when the clutch plate assembly (shown in FIG. 6) is incorporated in a clutch device, and the clutch device is taken up, the upper pad element 6 will be displaced axially towards the spring plate 1 and in so doing the portions 20' and 21' are straightened into the plane of the spring plate. In this way the pad element 6 is resiliently mounted on the clutch plate to provide a measure of cushioning during take-up of the clutch.

Although in FIG. 6 the lower pad element 5 is not resiliently mounted on the spring plate, if required a degree of cushioning may be provided for engagement of the pad element 5, for example by having the backing plate 9 of dish-shaped configuration and with a degree of flexibility so that the pad 10 is secured to the convex face of the backing plate which plate tends to straighten out as the clutch is taken up.

Figure 7:
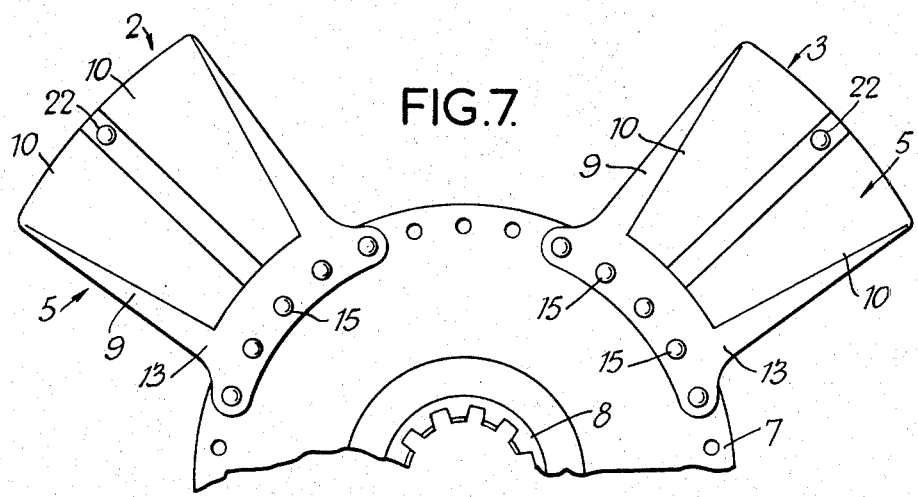
FIG. 7 shows one side of part of a further embodiment of a clutch plate assembly in accordance with the invention in which each pair of pad elements is provided with independent cushioning means.

The embodiment of clutch plate assembly partly shown in FIG. 7 has four pairs of pad elements (of which two pairs are shown at 2 and 3) which are circumferentially spaced and symmetrically disposed around the center boss part 7 and secured thereto by the rivets 15. Each of the pad elements 5, 6 is similar to those as above described with reference to FIG. 5 except that the tongue 11 and aperture 12 is omitted from the backing plate 9 and the pads 10 of friction material are additionally secured to the backing plate 9 by spigoting in a known manner as shown at 10a in FIG. 9. In this embodiment cushioning means is provided for each pair of opposed pad elements which means is independent of such cushioning means for the other pairs of pad elements. Each such cushioning means comprises a pair of spring plate elements 24 and 25 which are interposed between the opposed pair of backing plates 9 and secured by the rivets 15 to the periphery of the center boss part in a similar manner to the spring plate 1 in FIG. 1. The elements 24 and 25 are appropriately crimped at 24a and 25a respectively in opposite senses of the axial direction to provide an arrangement similar to that of single crimping and a desired axial spring effect for cushioning each of the opposed pad elements 5 and 6 during their axial flexure towards each other. The anti-drag rivet 22 connects the opposed backing plates 9 and conveniently extends through a gap provided between the elements 24 and 25. If required the elements 24 and 25 may be formed as a one piece element which is appropriately crimped and slotted for the rivet 22. Further, if required the elements 24 and 25 may be appropriately crimped in the same senses of the axial direction to provide an arrangement similar to that of double crimping.

Figure 8:
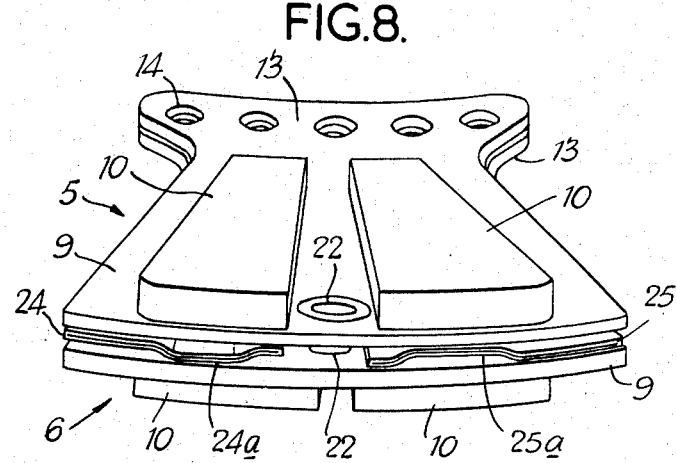
FIG. 8 is a perspective view of a pair of pad elements and interposed spring plate means incorporated in the assembly of FIG. 7.
Figure 9:
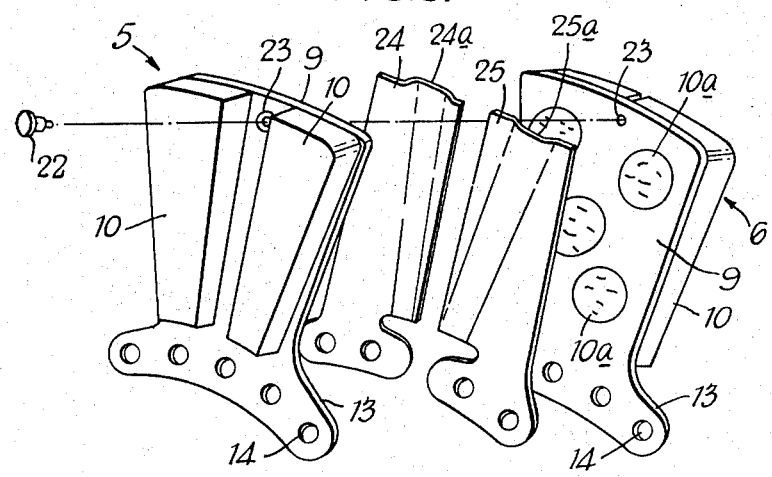
FIG. 9 is an exploded perspective view of the components in FIG. 8.

It will be noted from FIGS. 7 to 9 that each pair of plate elements 24 and 25 is substantially co-extensive with (and in fact has an area which is slightly less extensive than) the pair of pad elements between which it is interposed. This arrangement, as best seen in FIG. 7, provides a large degree of openness between the adjacent pairs of pad elements and considerably reduces the weight of the clutch plate assembly in comparison with that shown in FIG. 1. Such openness of the clutch plate assembly facilitates airflow to the transmission plates which engage with the clutch plate assembly in a clutch device and the weight reduction affords a reduction in inertia of the clutch plate assembly during its rotation.

Figure 10:
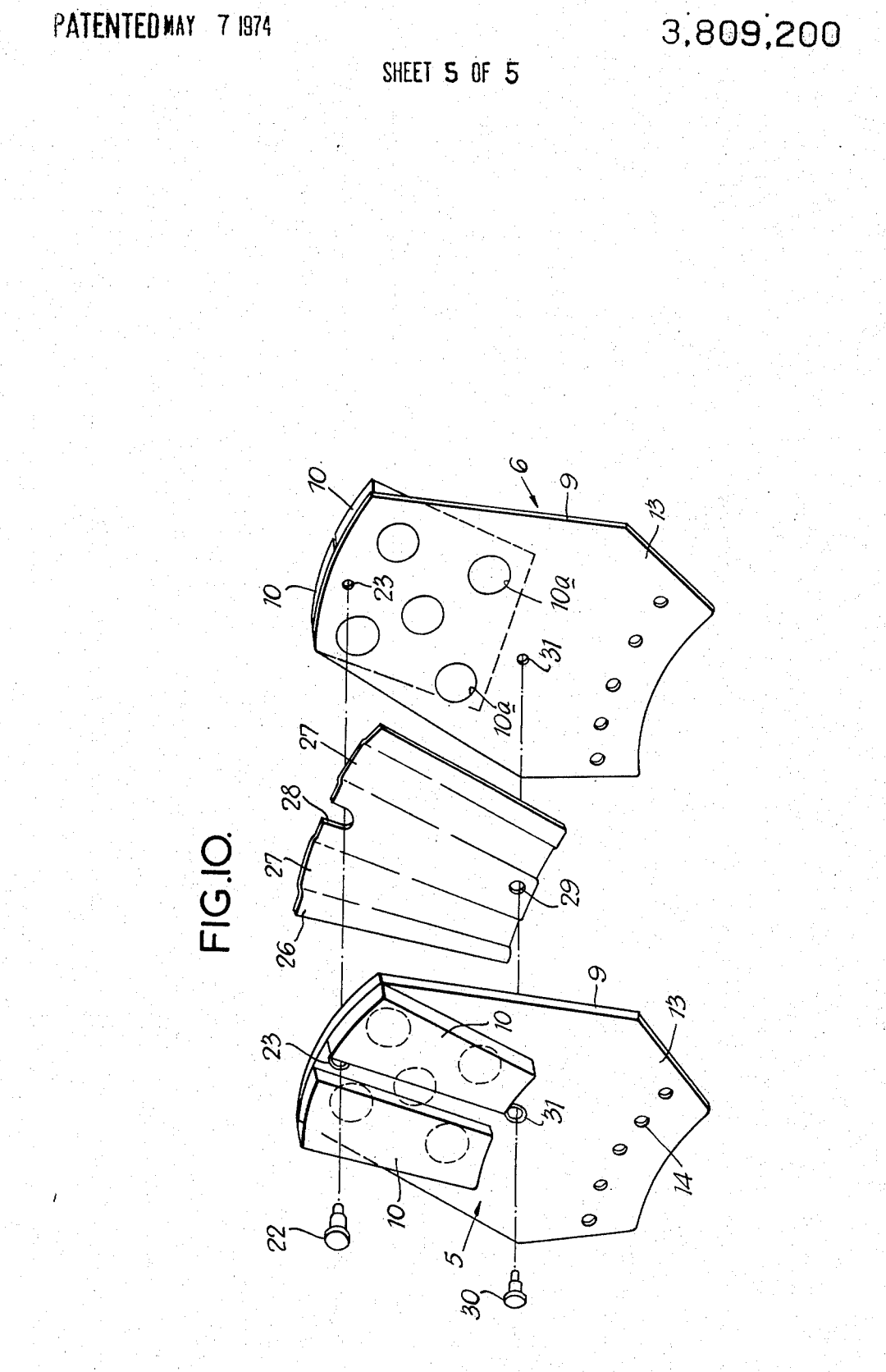

In the modification of FIG. 10 the backing plates 9 of the pairs of opposed pad elements 5 and 6 are mounted on the center boss part and riveted thereto in a similar manner to that shown in FIG. 7. Each pair of the opposed pad elements is provided with independent cushioning means similarly to the FIG. 7 embodiment which, in FIG. 10, comprises a spring plate element 26 interposed between the opposed backing plates 9. The plate element 26 is appropriately crimped at 27 to provide an axial spring effect similar to that of the double crimping shown in FIG. 6 (or to provide a single crimping effect) and has a slot 28 and an aperture 29. The plate element 26 is carried on the backing plates 9 of the opposed pair and clear of the center boss part by a locating pin in the form of a rivet 30 which extends through an aperture 31 in each backing plate and through the aperture 29 in the plate element. The plate element is prevented from rotating on the rivet 30 by the anti-drag rivet 22 which is located to extend through the slot 28. Conveniently the rivet 30 retains the opposed pad elements 5 and 6 from flexure axially away from each other beyond a predetermined limit (in addition to the rivet 22) and thus acts both as a restraining pin and a locating pin.

I claim:

1. A clutch plate assembly having a center boss means including a peripheral outwardly extending plate portion means including pad elements mounted on the periphery of said boss means, one of said boss means and said means including pad elements being provided with a cushioning surface, each said pad element including a backing plate and a pad of friction material firmly secured thereto, said pad elements being mounted in pairs which are peripherally spaced around said boss means, the pad elements in each pair being mounted with their backing plates axially opposed in back-to-back relationship on axially opposite sides of said plate portion; means mounting each of said backing plates for flexing movement of said backing plates axially relative to said plate portion and to the backing plate which opposes it, the backing plate of each pad element having an axially extending projection which engages in an aperture in said plate portion to restrain radial and tangential movement of that pad element relative to said plate portion, said cushioning surface interposed between each pair of opposed backing plates and providing a cushioning effect for at least one of the pad elements of a pair when the backing plates of said elements are flexed axially towards each other, said plate portion defining a slot underlying the pad elements in each pair, said slot opening at the outer periphery of said plate portion; and restraining means located in said slot, said restraining means engaging between the pad elements in each pair and serving to restrain flexure of the backing plates of each pair axially away from each other beyond a predetermined spacing.

2. A clutch plate assembly as claimed in claim 1 wherein the cushioning surface comprises a spring plate located between the opposed backing plates, said spring plate being formed to provide an axial spring effect on at least one of the opposed pad elements between which it is interposed.

3. A clutch plate assembly as claimed in claim 2 wherein the spring plate is formed as by crimping.

4. A clutch plate assembly as claimed in claim 1 wherein said plate portion comprises a generally annular plate extending around the periphery of the center boss means and between the opposed backing plates of each pair of pad elements.

5. A clutch plate assembly as claimed in claim 1 wherein said projection of the backing plate of each pad element extends through a said aperture in the plate portion and engages in a substantially complementary aperture in the backing plate of the pad element which is in back-to-back relationship with that pad element.

6. A clutch plate assembly as claimed in claim 1 wherein said restraining means comprises a pin which extends between the opposed backing plates.

7. A clutch plate assembly as claimed in claim 1 wherein said backing plates of the pairs of pad elements are maintained in engagement with the interposed cushioning surface.

8. A clutch plate assembly as claimed in claim 7 wherein said restraining means retains said backing plates to pre-load the interposed cushioning surface.

* * * * *